United States Patent [19]
Nakamura

[11] Patent Number: 5,507,031
[45] Date of Patent: Apr. 9, 1996

[54] DATA PROCESSING SYSTEM HAVING SCANNER FOR SEARCHING MEMORY FOR MESSAGE HAVING TOP PRIORITY AND/OR IDENTITY CODE IDENTICAL WITH NEW MESSAGE

[75] Inventor: Yasuhiro Nakamura, Kanagawa, Japan

[73] Assignee: NEC Corporation, Japan

[21] Appl. No.: 155,434

[22] Filed: Nov. 19, 1993

[30] Foreign Application Priority Data

Nov. 19, 1992 [JP] Japan .................................. 4-309916

[51] Int. Cl.⁶ ........................................... G06F 13/00
[52] U.S. Cl. .............. 395/800; 395/200.01; 364/DIG. 1; 364/242.94; 364/242.6
[58] Field of Search ................................... 395/800, 600, 395/200, 200.17, 200.1

[56] References Cited

U.S. PATENT DOCUMENTS

| | | | |
|---|---|---|---|
| 3,512,134 | 5/1970 | Packard ................................... | 395/600 |
| 4,128,899 | 12/1978 | Vinot ........................................ | 365/49 |
| 4,145,737 | 3/1979 | Lamb et al. ............................ | 395/425 |
| 4,152,762 | 5/1979 | Bird et al. ............................... | 395/425 |
| 4,197,588 | 4/1980 | Cason et al. ........................... | 395/425 |
| 4,791,553 | 12/1988 | Campanini ............................. | 395/425 |
| 4,847,752 | 7/1989 | Akashi ..................................... | 395/425 |
| 4,920,531 | 4/1990 | Isono et al. ............................. | 370/60 |

FOREIGN PATENT DOCUMENTS

| | | |
|---|---|---|
| 0057755 | 10/1981 | European Pat. Off. . |
| WO8801411 | 2/1988 | WIPO . |

OTHER PUBLICATIONS

European Search Report.

*Primary Examiner*—Mehmet Geckil
*Attorney, Agent, or Firm*—Whitham, Curtis, Whitham & McGinn

[57] ABSTRACT

A scanning unit is incorporated in a computer system communicable with another computer system for searching a random access memory unit for a message with the top priority as well as for identifying a received message with the message already stored in the random access memory unit, and a central processing unit is released from the scanning and the identification, thereby improving the throughput of given tasks.

6 Claims, 7 Drawing Sheets

DATA PROCESSING SYSTEM HAVING SCANNER FOR SEARCHING MEMORY FOR MESSAGE HAVING TOP PRIORITY AND/OR IDENTITY CODE IDENTICAL WITH NEW MESSAGE

FIELD OF THE INVENTION

This invention relates to a data processing system and, more particularly, to a small-sized computer system communicable with another computer system.

DESCRIPTION OF THE RELATED ART

A small-sized computer system such as a desk-top personal computer system can exchange messages with another computer system through a built-in communication unit, and FIG. 1 illustrates a typical example of the computer system. FIG. 1 designates the prior art computer system, and comprises a central processing unit 2 abbreviated as "CPU", a random access memory unit 3 abbreviated as "RAM", a peripheral unit 4, a communication unit 5 and an internal bus 6.

The central processing unit 2 executes various program sequences, and one of the program sequence achieves an exchange of messages with another computer system (not shown).

The random access memory unit 3 has a plurality of addressable memory areas for a storage of messages, and is accessible by the central processing unit 2. Namely, the central processing unit 2 supplies an address signal indicative of one of the memory areas through the internal bus 6 to the random access memory unit 3, and reads out a data code from and writes a data code into the memory area. The data code is transferred through the internal bus 6 between the central processing unit 2 and the random access memory unit 3.

The communication unit 5 is coupled with a communication port assigned to input and output data codes TX and RX, each expressing a message to or from another computer system. A message to be delivered is supplied from the central processing unit 2 through the internal bus 6 to the communication unit 5, and a message arriving at the communication port is transferred from the communication unit 5 through the internal bus 6 to the central processing unit 2.

The message is formatted into a predetermined code, and the predetermined code is broken down into an identity sub-area and a data sub-area. The lower four bits are assigned to the data sub-area, and are representative of a data information. On the other hand, the higher four bits are assigned to the identity sub-area, and are indicative of a priority of delivery. Therefore, the higher four bits and the lower four bits are hereinbelow referred to as "identity bits (or an identity code)" and "data information bits (or a data information code)". If identity bits are indicative of an absolute value greater than the absolute value of other identity bits, the data information accompanied with the greater identity bits is transferred to a destination earlier than the other data information.

Therefore, the random access memory unit 3 stores messages as shown in Table 1, by way of example, and the message "C" has the top priority, because the identity bits of "0000" are indicative of the least absolute value.

TABLE 1

| Address | Message | Identity bits | Data information |
|---------|---------|---------------|------------------|
| 0 | "A" | 0010 | 0000 |
| 1 | "B" | 0100 | 0001 |
| 2 | "C" | 0000 | 0010 |
| 3 | "D" | 0001 | 0100 |

The peripheral unit 4 supplies an output enable signal TRG1 to the communication unit 5 upon termination of a comparing sub-routine program in the program sequence for the exchange of messages, and the communication unit 5 delivers an output message TX from the communication port to the designation.

The exchange of messages is hereinbelow described. The random access memory unit 3 is assumed to store the messages "A" to "D" at the memory areas respectively assigned addresses 0 to 3. The central processing system 2 supplies the address signal indicative of address "0" through the internal bus 6 to the random access memory unit 3 in synchronism with the system clock "1" as shown in FIG. 2, and fetches the message "A" stored in the address area "0" in synchronism with the system clock "2". The message "A" thus fetched has the identity code of "0010" and the data information code of "0000", and the central processing unit 2 stores the identity code of "0010" and the data information code of "0000" in first and second internal registers thereof.

Subsequently, the central processing unit 2 transfers the address signal indicative of address "1" through the internal bus 6 to the random access memory unit 3 and relocates the identity code of "0010" and the associated data information code to third and fourth internal registers in synchronism with the system clock "3". The third and fourth internal registers are assigned to the identity code indicative of the least absolute value and to the data information code with the presently top priority.

The central processing unit 2 fetches the message "B" stored in address area "1" in synchronism with the system clock "4", and the message "B" thus fetched has the identity code of "0100" and the data information code of "0001". The identity code of "0100" and the data information code of "0001" of the message "B" are stored in the first and second internal registers, and the identity code of "0100" of the message "B" is compared with the identity code of "0010" of the message "A". Then, the central processing unit 2 makes a decision that the message "A" contains the data information code with the top priority. Therefore, the third and fourth internal registers are still occupied by the identity code and the data information code of the message "A".

The central processing unit 2 further supplies the address signal indicative of address "2" through the internal bus 6 to the random access memory unit 3 in synchronism with the system clock "5". The message "C" is read out from the address area "2" of the random access memory unit 3, and the identity code of "0000" and the data information code of the message "C" are respectively stored in the first and second registers in synchronism with the system clock "6". This means that the central processing unit 2 discards the identity code and the data information code of the message "B". The central processing unit 2 compares the identity code "0000" of the message "C" in the first internal register with the identity code "0010" of the message "A", and makes a decision that the message "C" has the priority over the message "A".

The central processing unit 2 further supplies the address signal indicative of address "3" through the internal bus 6 to the random access memory unit 3, and transfers the identity code of "0000" and the data information code of the message "C" to the third and fourth internal registers in synchronism with the system clock 7. The message "D" is read out from the address "3" to the first and second internal registers of the central processing unit 2 in synchronism with the system clock "8", and the central processing unit 2 compares the identity code of "0001" of the message "D" with the identity code of "0000" of the message "C". The central processing unit 2 confirms that the message "C" has the priority over the message "D", and keeps the identity code of "0000" and the data information code of the message "C" in the third and fourth internal registers.

When the sequential comparison is terminated, the central processing unit 2 informs the peripheral unit 4 that the sequential comparison is terminated, and transfers the message "C", i.e., the identity code "0000" and the data information code of "0010" through the internal bus 6 to the communication unit 5. The peripheral unit 4 is responsive to the control signal indicative of the termination of the sequential comparison, and supplies the output enable signal TRG1 to the communication unit 5. Then, the communication unit 5 produces the output data signal TX indicative of the message "C", and delivers the output data signal TX from the communication port.

On the other hand, if the input data signal RX reaches the communication port, the communication unit 5 reports the arrival of the input data signal RX to the central processing unit 2, and the central processing unit 2 fetches the message represented by the input data signal RX. The message represented by the input data signal RX is hereinbelow referred to as "message X", and the message "X" also has an identity code and a data information code. The identity code and the data information code of the message "X" are assumed to be stored in the first and second internal registers of the central processing unit 2.

The central processing unit 2 is, thereafter, supplied the address signal indicative of address "0" to the random access memory unit 3 in synchronism with a system clock, and fetches the message "A" through the internal bus 6 to the third and fourth internal registers in synchronism with the next system clock. The identity code of the message "A" is compared with the identity code of the message "X" to see whether or not the identity codes are consistent with each other. If the identity code of the message "A" is consistent with the identity code of the message "X", the central processing unit 2 writes the data information code of the message "X" into the data sub-area of the memory area assigned address "0".

However, if the identity code of the message "X" is inconsistent with the identity code of the message "A", the central processing unit 2 fetches the message "B", and compares the identity code of the message "X" with the identity code of the message "B" to see whether the identity codes are consistent or inconsistent with each other.

Thus, the central processing unit 2 sequentially compares the messages stored in the random access memory unit 3 with the message "X", and the data information code of the message "X" is written into the data sub-area of the memory area assigned to the message with the same identity code.

The prior art small-sized computer system thus arranged is communicable with another computer, and can exchange messages at random. However, the central processing unit 2 is expected to search the random access memory unit 3 for the message with the top priority and a message identical with the received message through the sequential comparison, and is prohibited from execution of other program sequences such as, for example, a data processing sequence for producing massages.

Moreover, the central processing unit 2 accesses the messages "A" to "D" stored in the random access memory unit 3 through the internal bus 6, and each access consumes two system clocks. If the random access memory unit 3 stores n messages, the sequential comparison consumes more than 2n system clocks.

Therefore, the prior art computer system suffers from a low throughput of the other program sequences.

SUMMARY OF THE INVENTION

It is therefore an important object of the present invention to provide a data processing system which releases a central processing unit from searching for a message with the top priority and from an identification of a received message.

To accomplish the object, the present invention proposes to incorporate a scanning unit exclusively used for the search and the identification in a data processing system.

In accordance with the present invention, there is provided a data processing system communicable with another computer system, comprising: a) a central processing unit executing a program sequence; b) a memory unit having a plurality of addressable memory areas for respectively storing messages in a rewritable manner, each of the messages having an identity code and a data code; c) a communication unit for communicating with the another computer system operative to receive a new message having an identity code and a data code for storing in one of the memory areas assigned to one of the messages with the identity code identical with the identity code of the new message and to produce an output signal representative of a message read out from one of the memory areas assigned to one of the messages with the identity code indicative of a transmission; and d) a scanning means physically separated from the central processing unit, and searching the memory unit for the one of the memory so as to allow the communication unit to communicate with the memory unit regardless of the program sequence simultaneously executable by the central processing unit.

BRIEF DESCRIPTION OF THE DRAWINGS

The features and advantages of the data processing system according to the present invention will be more clearly understood from the following description taken in conjunction with the accompanying drawings in which.

DESCRIPTION OF THE PREFERRED EMBODIMENTS

First Embodiment

Figure 1:
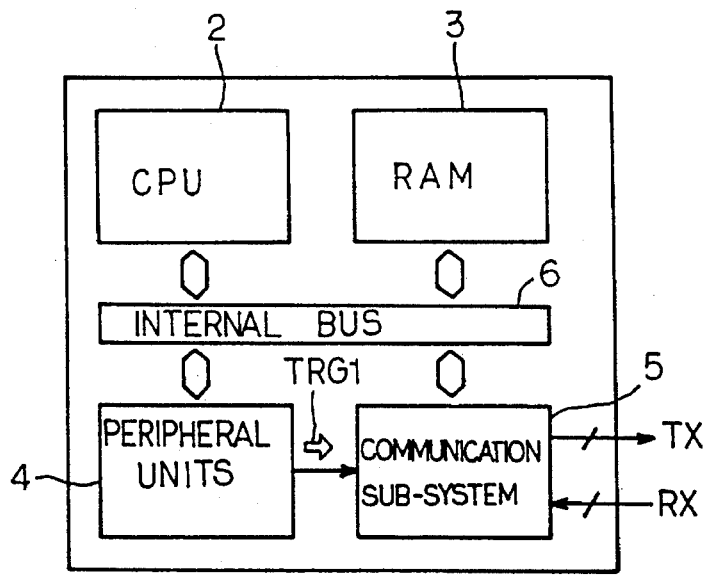
FIG. 1 is a block diagram showing the arrangement of the prior art small-sized computer system communicable with another computer system.
Figure 2:
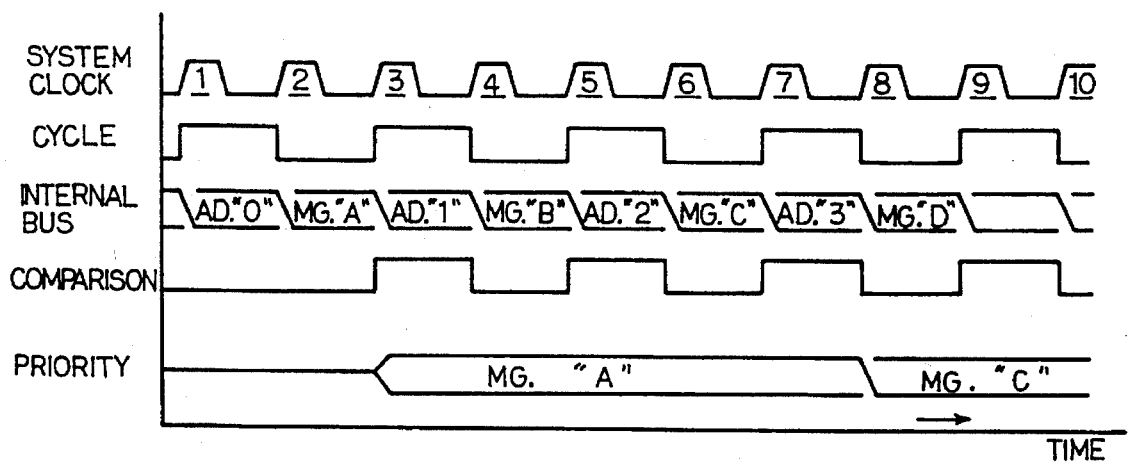
FIG. 2 is a timing chart showing the sequential comparison executed by the central processing unit incorporated in the prior art small-sized computer system.
Figure 3:
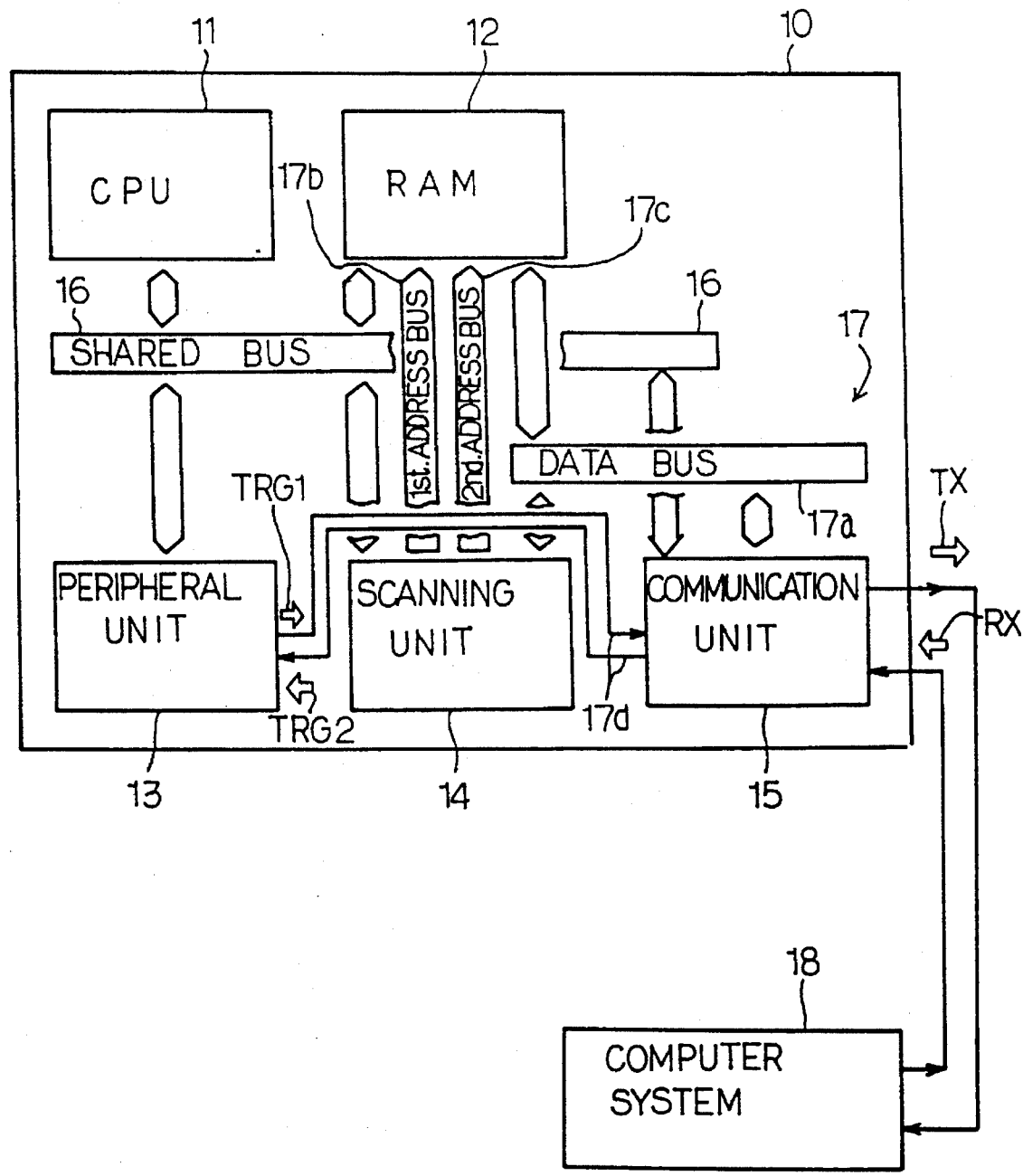
FIG. 3 is a block diagram showing the arrangement of a computer system according to the present invention.

Referring to FIG. 3 of the drawings, reference numeral 10 designates a small-sized computer system embodying the present invention, and the computer system 10 comprises a central processing unit 11, a random access memory unit 12, a peripheral unit 13, a scanning unit 14 and a communication unit 15.

The central processing unit 11 is communicable with the random access memory unit 12, the peripheral unit 13 and the scanning unit 14 through a shared bus system 16, and a private bus system 17 is available for scanning messages stored in the random access memory unit 12 and for transferring a message with the top priority to the communication unit 15.

The central processing unit 11 fetches instruction codes of program sequences stored in a program memory (not shown), and one of the program sequences is used for writing a data information code of a message supplied from another computer system 18. However, the program memory does not store any program sequence for scanning a message with the top priority.

The random access memory unit 12 has a plurality of addressable memory areas, and stores a plurality of messages in the memory areas in a rewritable manner. An address signal indicative of an address makes one of the memory areas accessible, and a message is written into or read out from the memory area assigned the address identical with the address represented by the address signal. The message is formatted into the same predetermined code as that of the prior art computer system, and the messages "A" to "D" are assumed to be stored in the random access memory unit 12 as shown in Table 1.

Predetermined jobs are assigned to the peripheral unit 13, and one of the jobs is production of an output enable signal TRG1. Another job is to report an arrival of a new message to the central processing unit in response to a write-request signal TRG2, and the central processing unit 11 starts the program sequence for searching the random access memory unit 12 for a message identical with the new message, and writes the data information code of the new message into the data sub-area of the memory area. However, the searching sequence and the write-in operation area similar to those of the prior art, and no further description is incorporated hereinbelow.

The communication unit 15 is responsive to the output enable signal TRG1, and produces an output data signal Tx representative of a message with the top priority from the message transferred from the random access memory unit 12. The communication unit 15 is further operative to monitor a communication port to see whether or not a new message arrives thereat, and produces the request signal TRG2. The request signal TRG2 is supplied to the peripheral unit 13, and the peripheral unit requests the central processing unit 11 to identify the new message as well as to write the data information code of the new message into a memory area assigned to the message with the same identity code.

The private bus system 17 has a data bus 17a, first and second address buses 17b and 17c and a control signal bus 17d. The data bus 17a transfers a message from the random access memory unit 12 to the scanning unit 14 and from the random access memory unit 12 to the communication unit 15, and the first address bus 17b transfers an address signal indicative of an address sequentially incremented in a scanning sequence from the scanning unit 14 to the random access memory unit 12. The second address bus 17c supplies the random access memory unit 12 the address signal indicative of the address assigned to the memory area storing the message with the top priority, and the control signal bus 17c propagates the output enable signal TRG1 and the request signal TRG2 between the peripheral unit 13 and the communication unit 15.

Figure 4:
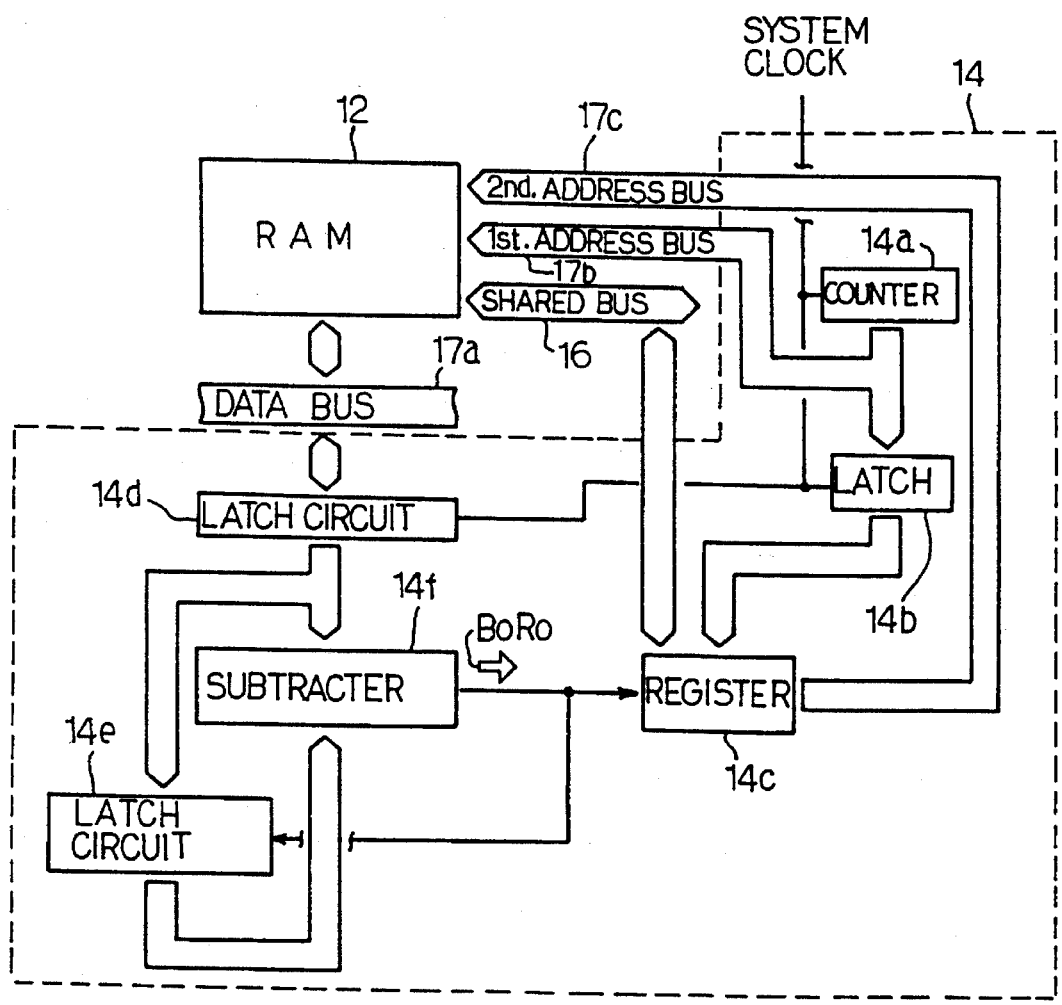
FIG. 4 is a block diagram showing the arrangement of a scanning unit incorporated in the computer system according to the present invention.

Turning to FIG. 4 of the drawings, the scanning unit 14 is illustrated in detail, and the scanning unit 14 is available for searching a memory unit for a message with the top priority. The scanning unit 14 comprises a counter 14a, a latch circuit 14b, a register 14c, latch circuits 14d and 14e and a subtracter 14f. The counter 14a is responsive to a system clock signal for sequentially incrementing the address signal indicative of one of the memory areas of the random access memory unit 12, and supplies the address signal to the random access memory unit 12 and the latch circuit 14b. The latch circuit 14b temporally keeps the address signal presently supplied to the random access memory unit 12, and the address stored in the latch circuit 14b is sequentially incremented by the counter 14a. The register 14c is responsive to a borrow signal BORO for storing the address signal in the latch circuit 14b, and the address signal stored therein is indicative of the memory area storing a message with the presently top priority. The latch circuit 14d stores an identity code read out from the memory area assigned the address represented by the address signal in the latch circuit 14b, and the latch circuit 14d supplies the identity code to the subtracter 14f and the latch circuit 14e. The latch circuit 14e stores the identity code indicative of the least absolute value, and the subtracter 14f the absolute value of the identity code in the latch circuit 14d from the least absolute value. If the absolute value of the identity code in the latch circuit 14d is less than the least absolute value, the subtracter 14f produces the borrow signal BORO, and the borrow signal BORO is supplied to not only the register 14c but also the latch circuit 14e. Then, the register 14c replaces the address signal indicative of the address storing the message with the previous top priority with the address signal indicative of the address storing the message with the present top priority. Similarly, the latch circuit 14e replaces the identity code indicative of the previous least absolute value with the identity code indicative of the new least absolute value.

Figure 5:
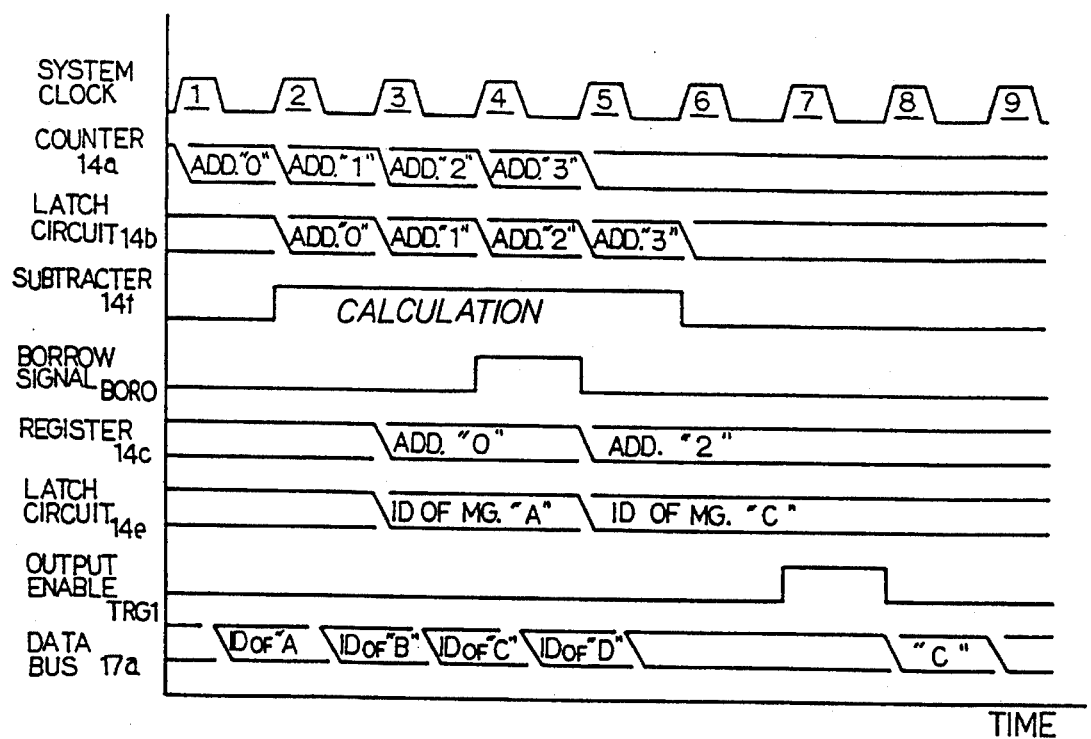
FIG. 5 is a timing chart showing a sequential comparison executed by the scanning unit.

As described hereinbefore, the central processing unit 12 searches the random access memory unit 12 for a message with the same identity code as that of a new message through a program sequence, and description is focused on a scanning sequence for transmission of the output data signal TX with reference to FIG. 5 on the assumption that the messages "A" to "D" are stored in the random access memory unit 12 as shown in Table 1.

When the central processing unit 11 requests the scanning unit 14 to search the random access memory unit 12 for a message with the top priority through the shared bus system 16, the counter 14a resets the address therein to zero in synchronism with the leading edge of the system clock "1", and the address signal indicative of address "0" is transferred from the counter 14a to the first address bus 17b and the latch circuit 14b. The random access memory unit 12 supplies the identity code of the message "A" from the memory area assigned address "0" to the data bus 17a.

The latch circuit 14b latches address "0" in synchronism with the leading edge of the system clock "2", and the counter 14a increments the address to "1". The address "0" is transferred to the register 14c, and is stored in the register 14c, because address "0" is indicative of the first memory area. The latch circuit 14d is responsive to the leading edge of the system clock "1", and stores the identity code of the message "A". The identity code of the message "A" is immediately transferred to the latch circuit 14e, and is stored in the latch circuit 14e, because the identity code is read out from the first memory area.

The first identity code and the first address "0" may be stored in the latch circuit 14e and the register 14c as follows. When the central processing unit 11 instructs the scanning unit 14 to search the random access memory unit 12 for the address storing the message with the top priority, an identity code indicative of the maximum absolute value is loaded to the latch circuit 14e. If so, the subtracter 14f produces the borrow signal BORO at the leading edge of the system clock "2", and address "0" and the first identity code are respectively stored in the register 14c and the latch circuit 14e, respectively.

The random access memory unit 12 supplies the identity code of the message "B" from address "1" through the data bus 17a to the latch circuit 14d at the trailing edge of the system clock "2".

The latch circuits 14b and 14d latch address "1" and the identity code of the message "B" in synchronism with the leading edge of the system clock "3", and the subtracter 14f subtracts the absolute value of the identity code of the message "A" stored in the latch circuit 14e from the absolute value of the identity code of the message "B" in the latch circuit 14d. The identity code of the message "B" is greater in absolute value than the identity code of the message "A", and any borrow signal BORO is not produced through the subtraction. This results in that the register 14c and the latch circuit 14e keep address "0" and the identity code of the message "A".

The counter 14a increments the address to "2" in synchronism with the leading edge of the system clock "3", and the address signal indicative of address "2" is supplied from the counter 14a to the first address bus 17b and the latch circuit 14b. The random access memory unit 12 supplies the identity code of the message "C" through the data bus 17a to the latch circuit 14d at the trailing edge of the system clock "3".

The latch circuits 14b and 14d latch address "2" and the identity code of the message "C" in synchronism with the leading edge of the system clock "4", and the subtracter 14f subtracts the absolute value of the identity code of the message "A" in the latch circuit 14e from the absolute value of the identity code of the message "C" in the latch circuit 14d. Since the identity code of the message "A" is greater in absolute value than the identity code of the message "C", the subtracter 14f produces the borrow signal BORO, and supplies it to the register 14c and the latch circuit 14e. As a result, address "2" and the identity code of the message "C" are respectively stored in the register 14c and the latch circuit 14e.

The counter 14a increments the address to "3" in synchronism with the leading edge of the system clock "4", and the address signal indicative of address "3" is supplied to the first address bus 17b and the latch circuit 14b. The random access memory unit 12 supplies the identity code of the message "D" from address "3" through the data bus 17a to the latch circuit 14d at the trailing edge of the system clock "4".

The latch circuits 14b and 14d latch address "3" and the identity code of the message "D" at the leading edge of the system clock "5", and the subtracter 14f subtracts the absolute value of the identity code of the message "C" in the latch circuit 14e from the absolute value of the identity code of the message "D" in the latch circuit 14d. Since the identity code of the message "D" is greater in absolute value than the identity code of the message "C", any borrow signal BORO is not produced, and the register 14c and the latch circuit 14e keeps address "2" and the identity code of the message "C".

Thus, all of the messages are sequentially read out from the random access memory unit 12, and are calculated by the subtracter 14f so as to look for a message with the top priority, i.e., the identity code indicative of the least absolute value. In the example shown in Table 1, the message C is given the priority, and the register 14c and the latch circuit 14e keep address "2" and the identity code of the message "C" at the end of the search.

When the search is completed, the scanning unit 14 reports the termination of the scanning to the central processing unit 12, and the central processing unit 12 requests the peripheral unit 13 to supply the output enable signal TRG1 to the communication unit 15. The register 14c supplies the address signal indicative of address "2" through the second address bus 17c to the random access memory unit 12 in response to the output enable signal TRG1, and the message "C" is read out from the random access memory unit 12 to the data bus 17a. The communication unit 15 produces the output data signal TX representing the message "C", and the output data signal TX delivers the output data signal TX to the computer system 18.

In order to select one of the first and second data buses 17b and 17c, a selector unit (not shown) may be connected between the first and second data buses 17b and 17c and the random access memory unit 12, and the selector unit selects the second address bus 17c in the presence of the output enable signal TRG1.

As will be understood from the foregoing description, the scanning unit 14 searches the random access memory unit 12 for a message with the top priority independent from the central processing unit 12, and allows the central processing unit 12 to execute a program sequence while the scanning unit 14 is searching the random access memory unit 12. This results in improvement in the throughput of the instructions.

Second Embodiment

Figure 6:
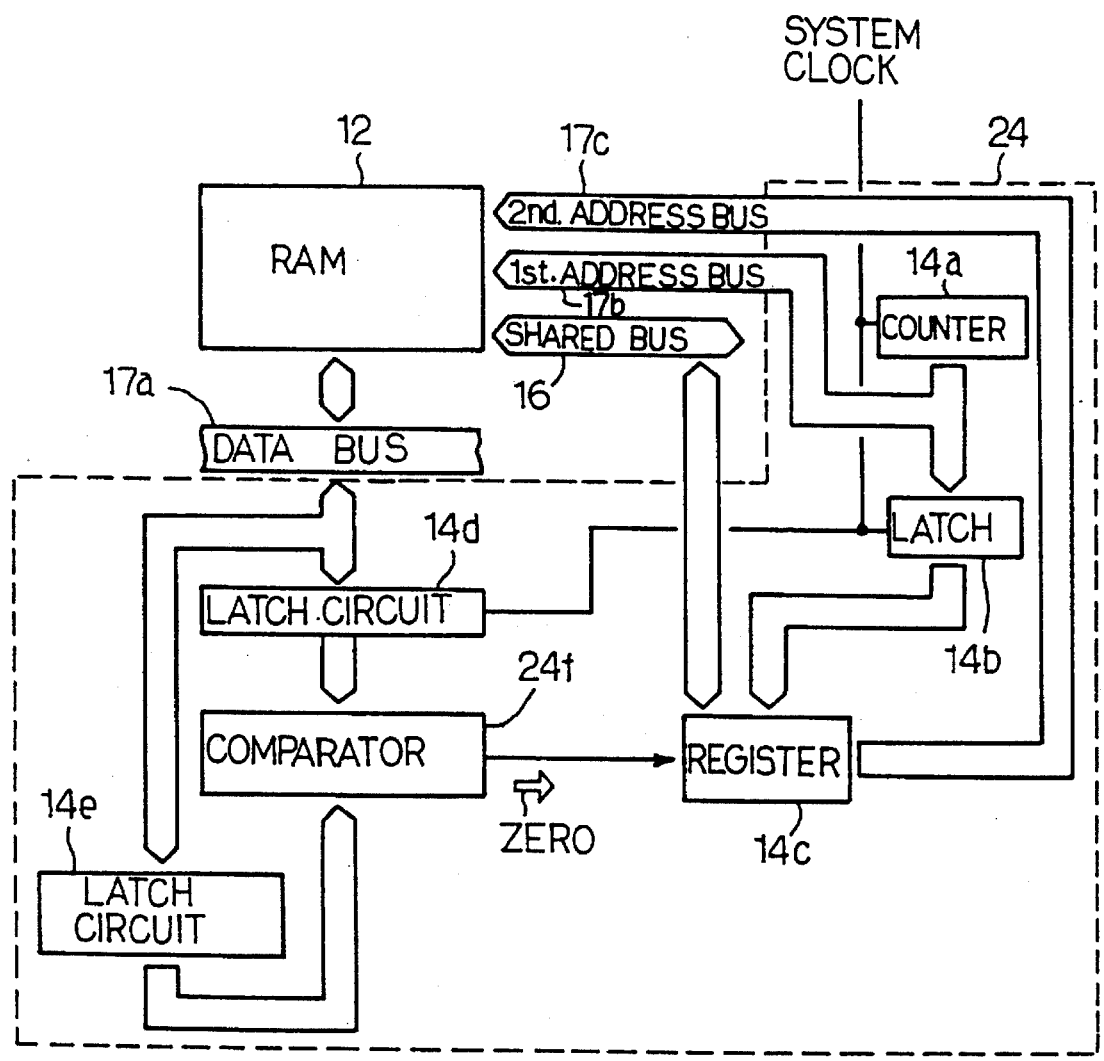
FIG. 6 is a block diagram showing a scanner incorporated in another computer system according to the present invention.

Turning to FIG. 6 of the drawings, a scanning unit 24 incorporated in another computer system embodying the present invention is illustrated. Although a central processing unit, a random access memory unit, a peripheral unit and a communication unit are incorporated in the computer system implementing the second embodiment, these component units are similar to those of the first embodiment, and are labeled with the same references as those of the first embodiment without detailed description.

The scanning unit 24 is available for identifying a new message represented by an input data signal Rx with a message already stored in the random access memory unit 24, and the central processing unit 11 searches the random access memory unit 12 for a message with the top priority through a program sequence similar to the prior art. The scanning unit 24 identifies the new message with one of the messages already stored in the random access memory unit 12 by comparing the identity codes, and, for this reason, the subtracter 14f is replaced with a comparator 24f in the scanning unit 24. The other components are labeled with the same references as those of the scanning unit 14, and the latch circuit 14e is directly connected with the data bus 17a for storing the identity code of the new message.

Figure 7:
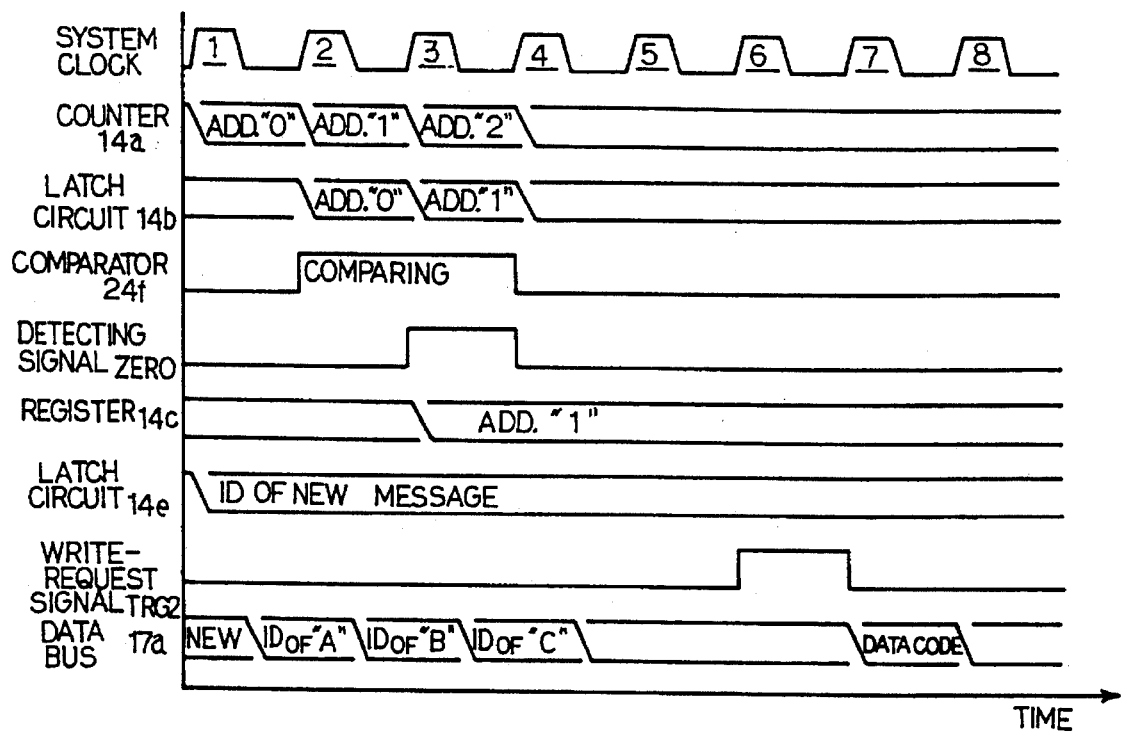
FIG. 7 is a timing chart showing a sequential comparison executed by the scanner shown in FIG. 6.

Description is made on a sequential comparison of the identity codes with reference to FIG. 7 of the drawings, and the random access memory unit 12 is assumed to store the messages "A" to "D" as shown in Table 1. An input data signal RX expresses the new message, and the new message is assumed to have an identity code of "0100" followed by a data code.

When the identity code of the new message arrives at the communication port, the communication unit 15 latches the identity code, and requests the central processing unit 11 to specify the memory area of the random access memory unit 12 for storing the new message. Then, the communication unit 15 supplies the identity code of the new message to the data bus 17a. However, the data code of the new message is maintained in the communication unit 15. The central processing unit 11 instructs the scanning unit 24 to search the random access memory unit 12 for an identity code identical with the identity code of the new message.

Upon receipt of the instruction from the central processing unit 11, the scanning unit 24 resets the counter 14a to zero, and latches the identity code of the new message at the leading edge of the system clock "1". The random access memory unit 12 supplies the identity code of the message "A" from address "0" through the data bus 17a to the latch circuit 14d at the trailing edge of the system clock "1".

The latch circuits 14b and 14d latch address "0" and the identity code of the message "A" at the leading edge of the system clock "2", and the comparator 24f compares the identity code of the new message with the identity code of the message "A". The identity code of the new message and the identity code of the message "A" are "0100" and "0010", and are different from each other. The comparator 24f does not produce the detecting signal ZERO.

The counter 14a increments the address to "1" in synchronism with the leading edge of the system clock "2", and supplies the address signal indicative of address "1" to the first address bus 17b and the latch circuit 14b. The random access memory unit 12 supplies the identity code of "0100" from the memory area assigned to the message "B" through the data bus 17a to the latch circuit 14d at the trailing edge of the system clock "2".

The latch circuits 14b and 14d latch address "1" and the identity code of the message "B" at the leading edge of the system clock "3", and the comparator 24f compares the identity code of the new message with the identity code of the message "B". Since the identity code of the new message and the identity code of the message "B" are "0100", the comparator 24f makes a decision that the identity codes are identical with each other. Then, the comparator 24f produces the detecting signal ZERO, and supplies the detecting signal ZERO to the register 14c. The latch circuit 14b has already stored address "2", and the register 14c memorizes address "1" in response to the detecting signal ZERO.

When the scanning unit 24 identifies the identity code of the message "B" with the identity code of the new message, the scanning unit 24 reports the termination of the scanning to the central processing unit 11, and the central processing unit 11 requests the peripheral unit 13 to supply the write-request signal TRG2 to the communication unit 15. The second address bus 17c propagates the address signal indicative of address "1" from the register 14c to the random access memory unit 12, and the communication unit 15 transfers the data code of the new message through the data bus 17a to the memory area assigned address "1". Thus, the data code of the message "B" is replaced with the data code of the new message without any execution of a program sequence by the central processing unit 11.

Third Embodiment

Figure 8:
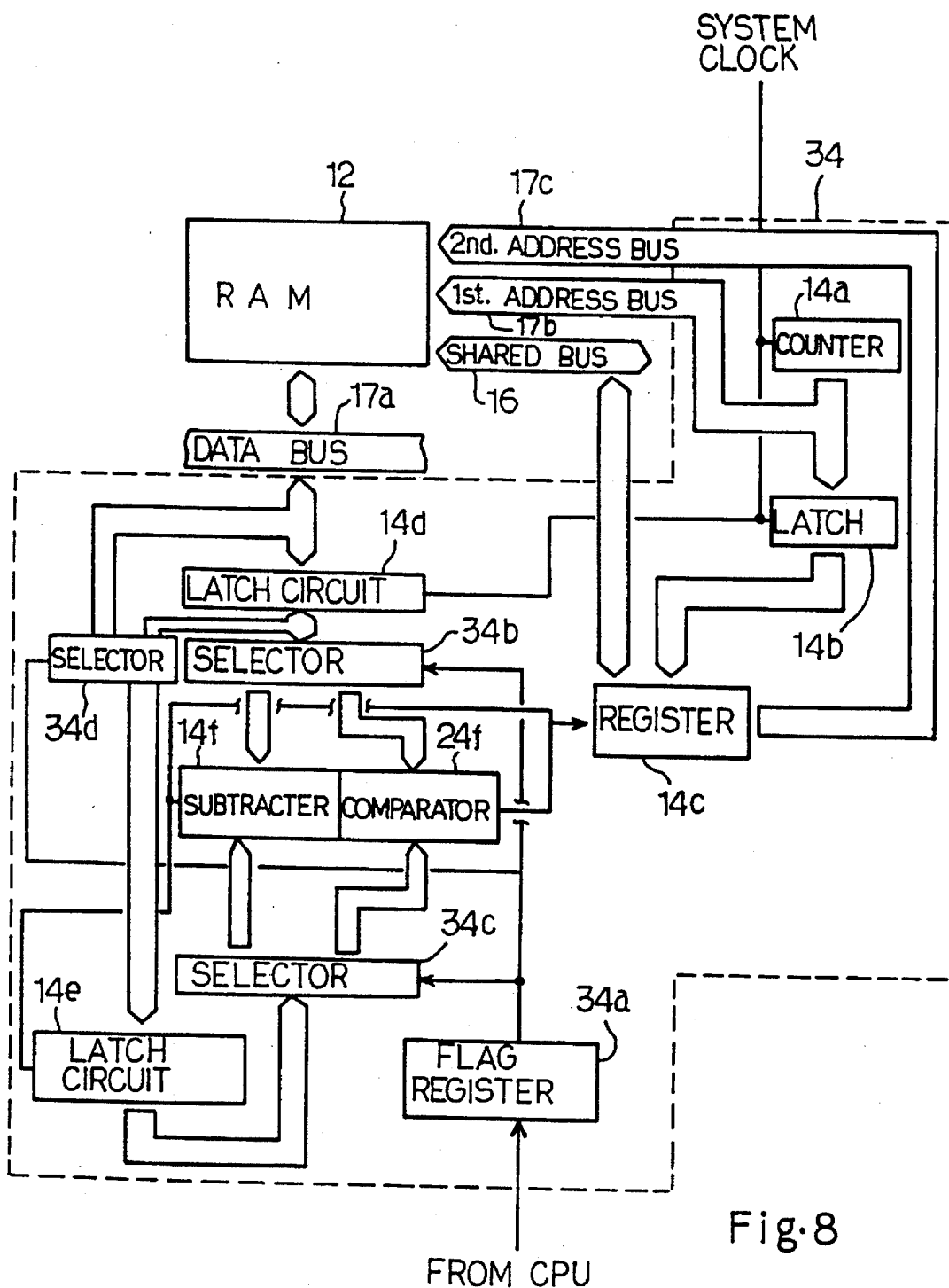
FIG. 8 is a block diagram showing the arrangement of a scanning unit incorporated in yet another computer system according to the present invention.

Turning to FIG. 8 of the drawings, a scanning unit 34 is incorporated in yet another computer system embodying the present invention. The other units of the computer system implementing the third embodiment are similar to those of the first embodiment, and no further description is incorporated hereinbelow for the sake of simplicity.

The scanning unit 34 is a compromise of the first and second embodiments, and is available for both of the search for a message with the top priority and the identification of the message already stored. Therefore, the scanning unit 34 has all of the components of the first and second embodiments labeled with the same references. The scanning unit 34 further has a flag register 34a and three selectors 34b, 34c and 34d for selectively executing the search and the identification.

Namely, the central processing unit 11 supplies a flag signal indicative of the search or the identification to the flag register 34a, and the flag register 34 controls the selectors 34b, 34c and 34d. If the central processing unit 11 requests the scanning unit 34 to search the random access memory unit for a message with the top priority, the selectors 24b and 34c connect the latch circuits 14d and the 14e with the subtracter 14f, and the selector 24d connects the latch circuit 14d with the latch circuit 14e. On the other hand, when the central processing unit 11 requests the scanning unit 34 to search the random access memory unit 12 for a message corresponding to the new message, the selectors 34b ad 34c connect the latch circuits 14d and 14e with the comparator 24f, and the selector 24d connects the data bus 17a with the latch circuit 14e.

The searching sequences are similar to those of the first and second embodiments, and description is omitted for avoiding repetition.

Although particular embodiments of the present invention have been shown and described, it will be obvious to those skilled in the art that various changes and modifications may be made without departing from the spirit and scope of the present invention. For example, the comparator may be implemented by an array of exclusive-OR gates, and the comparator of the second embodiment may be replaced with a subtracter accompanied with a NOR gate for discriminating the difference of "0". Moreover, the priority of transmission may be given to an identity code indicative of the greatest absolute value, and a calculator may subtract the absolute value in the latch circuit 14e from the absolute value in the latch circuit 14d for producing the borrow signal.

What is claimed is:

1. A data processing system communicable with another computer system, comprising:

a bus system;

a central processing unit connected to said bus system and executing a program sequence for transmitting a message to said another computer system;

a memory unit connected to said bus system and having a plurality of addressable memory areas for respectively storing messages in a rewritable manner, each of said messages having a first identity code and a first data code;

a communication unit connected to said bus system and receiving a new message having a second identity code and a second data code from said another computer system for storing said new message in one of said memory areas assigned to one of said messages with the first identity code identical with said second identity code, said communication unit supplying an output signal representative of a message read out from any one of said memory areas and having the first identity code indicative of a priority of transmission to said another computer system; and scanning means connected to said bus system and physically separated from said central processing unit, and including:

an address counter connected through a first address bus with an address port of said memory unit, and sequentially incrementing an address of an address signal for sequentially specifying said plurality of addressable memory areas, a first latch circuit connected with an address counter for storing said address signal sequentially incrementing said address, a register connected to said first latch circuit and responsive to a control signal for storing said address signal memorized in said first latch circuit, said register being further connected through a second address bus with said address port of said memory unit, a second latch circuit connected with a data port of said memory unit for storing said first identity codes sequentially read out from said addressable memory areas specified by said address signal supplied through said first address bus, a third latch circuit connected with said second latch circuit and responsive to said control signal for storing said first identity code memorized in said second latch circuit in a rewritable manner, and a calculator comparing said first identity code stored in said second latch circuit with said first identity code stored in said third latch circuit to determine whether said first identity code stored in said second latch circuit has said priority of transmission over said first identity code stored in said third latch circuit, said calculator producing said control signal when said first identity code stored in said second latch circuit has priority over said first identity code stored in said third latch circuit, said register supplying said address signal through said second address bus to said address port of said memory unit when all of said first identity codes are read out from said memory unit, thereby causing said memory unit to supply the message stored in the addressable memory area specified by said address signal to said communication unit as said message having said first identity code indicative of said priority of transmission.

2. A data processing system as recited in claim 1 wherein said calculator comprises a subtracter for subtracting the value stored in said second latch circuit and said third latch circuit, said control signal being produced when a borrow takes place in the subtraction.

3. A data processing system as recited in claim 1 wherein said memory unit supplies a message with the priority of transmission from said any one of said plurality of addressable memory areas indicated by said address signal propagated through said second address bus through said data bus to said communication unit so that said communication unit produces said output signal indicative of said message supplied from said memory unit.

4. A scanner for a random access memory unit having a plurality of addressable memory areas, comprising:

an address counter connectable through a first address bus to said memory unit, for sequentially incrementing an address of an address signal indicative of an addressable memory area of said plurality of addressable memory areas, each of said addressable memory areas comprising a data code and an identity code for indicating a priority for said data code, a first latch circuit connected with said address counter for storing said address signal, a register responsive to a control signal for storing said address signal in said first latch circuit, and connectable through a second address bus to said memory unit for supplying said address signal, a second latch circuit connected through a data bus to said memory unit for storing a first identity code read out from said addressable memory area indicated by said address signal propagated through said first address bus, said register supplying said address signal through said second address bus to an address port of said memory unit when said first identity code is read out from said memory unit, thereby causing said memory unit to supply said data code stored in the addressable memory area specified by said address signal as said message having said first identity code indicative of said priority of transmission;

a third latch circuit responsive to said control signal for storing a second identity code indicative of a priority for a data transmission, and a calculator executing a calculation on said first and said second identity codes in said second and third latch circuits, respectively, to determine whether said identity code in said second latch circuit has a priority of said transmission over said identity code in said third latch circuit, said calculator producing said control signal when said identity code in said second latch circuit has the priority over said identity code in said third latch circuit said calculator comprises a subtracter for subtracting the value stored in said second latch circuit and said third latch circuit, said control signal being produced when a borrow takes place in the subtraction.

5. A scanner as set forth in claim 4 in which said memory unit supplies a message with the priority of transmission from said any one of said plurality of addressable memory areas indicated by said address signal propagated through said second address bus through said data bus to said communication unit so that said communication unit produces said output signal indicative of said message supplied from said memory unit.

6. A scanner for a random access memory unit having a plurality of addressable memory areas, comprising:

an address counter connectable through a first address bus to said memory unit, and sequentially incrementing an address of an address signal indicative of an addressable memory area of said plurality of addressable memory areas, each of said plurality of addressable memory areas comprising a data code and an identity code for indicating a priority for said data code, a first latch circuit connected to said address counter for storing said address signal, a register responsive to a control signal for storing said address signal in said first latch circuit, and connectable through a second address bus to said memory unit for supplying said address signal, a second latch circuit connected through a data bus to said memory unit for storing said identity code read out from said addressable memory area indicated by said address signal propagated through said first address bus, said data bus being further connected to a communication unit communicating with an external device, a third latch circuit connected with said data bus for storing a new message identity code received from a communication device, and a comparator for comparing said new message identity code in said third latch circuit with said identity code stored in said second latch circuit to determine whether said identity codes are consistent with each other, said comparator producing said control signal when said identity codes are consistent with one another, said communication unit supplying a new message data code through said dais bus to said memory unit for writing said data code of said new message into said one of said plurality of addressable memory areas indicated by said address signal propagated through said second address bus.

* * * * *